(No Model.)

J. BRADLEY.
CHECK ROWER FOR CORN PLANTERS.

No. 280,714. Patented July 3, 1883.

Witnesses.
Phil C. Dietrich
W. R. Keyworth

Inventor:
Jeremy Bradley
by J. B. Alexander
Attorney.

UNITED STATES PATENT OFFICE.

JEREMY BRADLEY, OF SPARTA, WISCONSIN, ASSIGNOR TO HIMSELF AND LUCIUS M. STEVENS, OF SAME PLACE.

CHECK-ROWER FOR CORN-PLANTERS.

SPECIFICATION forming part of Letters Patent No. 280,714, dated July 3, 1883.

Application filed December 4, 1882. (No model.)

*To all whom it may concern:*

Be it known that I, JEREMY BRADLEY, of Sparta, in the county of Monroe and State of Wisconsin, have invented certain new and useful Improvements in Check-Rowers for Corn-Planters; and I do hereby declare that the following is a full, clear, and exact description thereof, reference being had to the accompanying drawings, and to the letters of reference marked thereon, which form part of this specification, in which—

Figure 1:
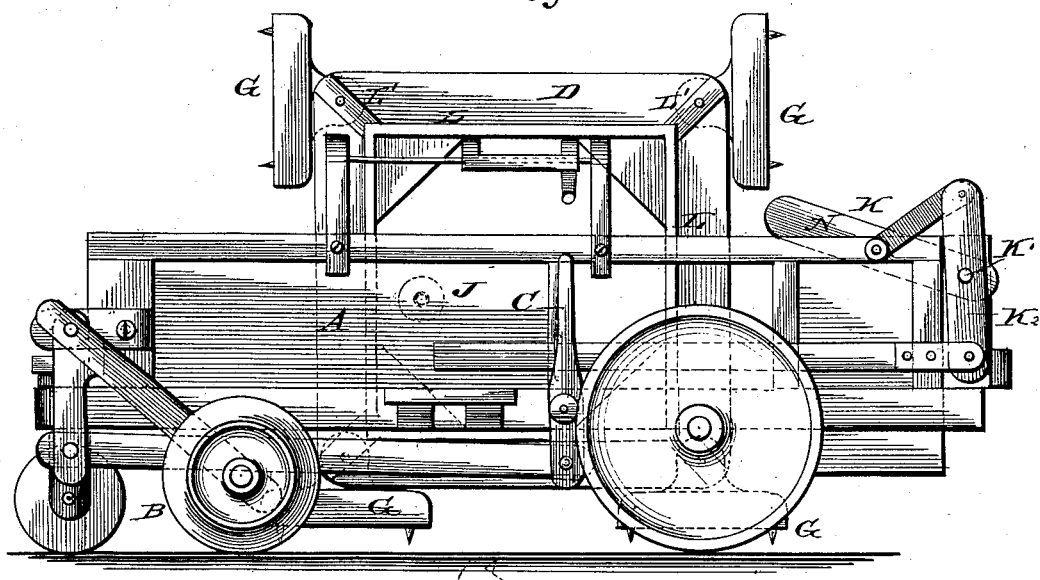
Figure 2:
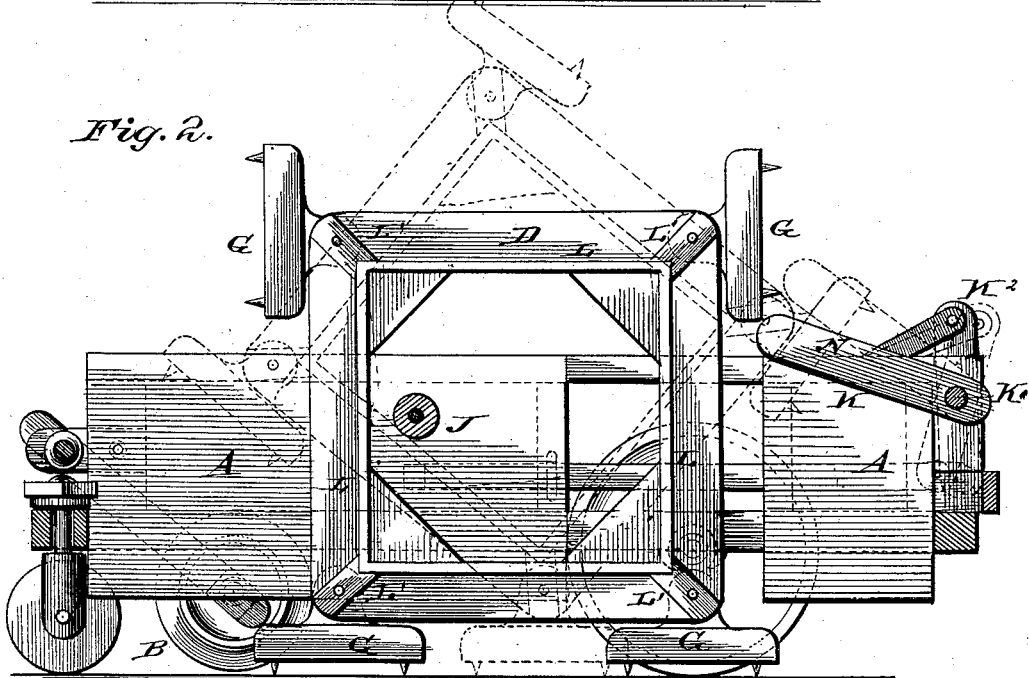
Figure 3:
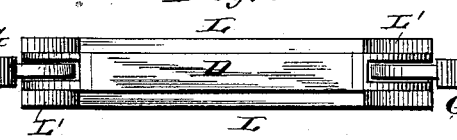

Figure 1 is an elevation showing one side of my improved check-row attachment for corn-planters. Fig. 2 is a section taken longitudinally and vertically through the same, showing the check-row frame in two positions. Fig. 3 is a top view of the check-row frame.

This invention relates to means for "check-rowing" for the purpose of planting corn at regular intervals; and the nature of my invention consists in a rectangular frame which is provided with pivoted feet at each angle, and which will step off the required spaces and indicate the same by marks in the ground, as will be fully understood from the following description, when taken in connection with the annexed drawings.

For the purpose of illustrating one practical mode of carrying my invention into effect, I have shown a carriage, A, the front wheels, B, of which have their peripheries V-shaped, and the rear wheels have their peripheries concave. The front wheels form a compressed furrow to receive the corn, and the rear wheels cover the corn when dropped. The front wheels have short axles applied to levers, which are so arranged that the front part of the machine can be raised or depressed at pleasure for the purpose of passing stumps and other obstructions. I use a hand-lever, C, for this purpose.

The main frame of the machine is constructed of sills, uprights, and side-boards, so framed as to form a substantial support and guide for the new check-row rotary frame, which I shall now describe.

D designates a rectangular frame, which is composed of beams suitably mortised together. The distance between the angles of this frame is equal to the spaces or "steps" which I desire to plant the grains of corn. At each angle of this frame I pivot a foot, G, which may be shod with spurs for the purpose of maintaining traction and causing a rotation of the frame when the wagon is progressing.

J designates a fulcrum for the frame D, which may be an anti-friction roller having its end bearings in the side-boards of the wagon.

K designates a broad lever, which has its fulcrum on a rod, K', supported by standards K² of the main frame of the wagon, and which is adapted for lifting the frame D and holding it out of operation; also for moving the frame into or out of operation. The frame D acts by its own gravity, and it is provided with ribs L, which form guides between the cheeks of the wagon side-boards. At the four angles of the said frame, and radiating from the center thereof, forming angles of forty-five degrees, are ribs L', the object of which is to trip the arms N, which actuate the dropping devices.

My present invention is not confined to the means shown for dropping the corn, as any well-known mechanical devices may be employed in combination with my revolving stepping-off frame for the accomplishment of the same object.

Having described my invention, what I claim as new, and desire to secure by Letters Patent, is—

1. The combination, with the main frame of a corn-planter, of an angular walking and rotating frame constructed and arranged to rotate loosely around a fulcrum, all substantially as set forth.

2. The combination, with the main frame of a corn-planter, of an angular walking or rotating frame loosely confined within the main frame, and provided with spurred feet pivoted to its angles, and suitable devices for tripping the corn-dropping mechanism, all constructed and adapted to operate substantially as and for the purposes set forth.

3. The combination of a rectangular frame, the pivoted feet applied to the angles thereof, the radial ribs thereon, and means for dropping corn, all constructed and adapted to operate substantially in the manner described.

In testimony that I claim the foregoing as my own invention I affix my signature in presence of two witnesses.

JEREMY BRADLEY.

Witnesses:
A. E. WEBB,
S. J. LYON.